US011102227B2

(12) United States Patent
Govindan

(10) Patent No.: US 11,102,227 B2
(45) Date of Patent: Aug. 24, 2021

(54) ECOSYSTEM-AWARE SMART ARRAYS FOR UNIFIED ANALYTICS AND TROUBLESHOOTING

(71) Applicant: EMC IP Holding Company LLC, Hopkinton, MA (US)

(72) Inventor: Balasundaram Govindan, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 109 days.

(21) Appl. No.: 16/382,470

(22) Filed: Apr. 12, 2019

(65) Prior Publication Data

US 2020/0329061 A1    Oct. 15, 2020

(51) Int. Cl.
*H04L 29/06* (2006.01)
*H04L 12/24* (2006.01)

(52) U.S. Cl.
CPC .......... *H04L 63/1425* (2013.01); *H04L 41/28* (2013.01); *H04L 63/168* (2013.01); *H04L 67/40* (2013.01)

(58) Field of Classification Search
CPC ..... H04L 63/1425; H04L 67/40; H04L 41/28; H04L 63/168
See application file for complete search history.

(56) References Cited

U.S. PATENT DOCUMENTS

| 10,755,226 | B1* | 8/2020 | Robyak | G06K 7/10366 |
|---|---|---|---|---|
| 2012/0185913 | A1* | 7/2012 | Martinez | G06F 9/45558 726/1 |
| 2014/0075499 | A1* | 3/2014 | Arun | G06F 16/2282 726/1 |
| 2015/0163121 | A1* | 6/2015 | Mahaffey | H04L 63/1425 707/687 |
| 2017/0134433 | A1* | 5/2017 | Hugenbruch | G06F 9/45558 |
| 2019/0132410 | A1* | 5/2019 | Kuzkin | H04L 67/2809 |

* cited by examiner

*Primary Examiner* — Carl G Colin
*Assistant Examiner* — Andrew Suh
(74) *Attorney, Agent, or Firm* — Amin, Turocy & Watson, LLP

(57) ABSTRACT

The described technology is generally directed towards providing unified analytics and troubleshooting for enterprise software systems. According to an embodiment, a system can comprise a memory that can store computer executable components, and a processor that can execute the computer executable components stored in the memory. The computer executable components can comprise a remote service component that receives first information from an edge array installed in a second security zone, wherein the edge array employs an application programming interface of an application to generate the first information from the application on a server in the second security zone. The system can further comprise a processing component that processes the first information, resulting in second information. The system can further comprise a communication component that communicates the second information to the edge array.

20 Claims, 8 Drawing Sheets

ECOSYSTEM-AWARE SMART ARRAYS FOR UNIFIED ANALYTICS AND TROUBLESHOOTING

TECHNICAL FIELD

The subject application generally relates to enterprise software systems, and, for example, to providing unified analytics and troubleshooting for enterprise software systems, and related embodiments.

BACKGROUND

Enterprise software systems can rely on a combination of interconnected software products to facilitate different functions. For example, in a data center, the core storage array can be supported by applications providing backup, recovery, mirroring, and virtualization services. Each of these systems can have different metrics to measure performance. These systems can also be provided by different vendors, and thus have different licenses, versions, and components. Different approaches to managing the interconnected software include having an external system, that manages the core storage array, also provide management to and analytics for the other software products.

At times however, using external resources can increase security risks and the use of network bandwidth. These disadvantages can often cause system administrators to forgo any integrated solution, and attempt to locally manage all of the systems. Also, analytics generated by systems can be improved if information from the interconnected software is considered as well.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components comprise a remote service component that receives first information from an edge array installed in a second security zone, wherein the edge array employs an application programming interface of an application to generate the first information from the application on a server in the second security zone. The system can further comprise a processing component that processes the first information, resulting in second information. The system can further comprise a communication component that communicates the second information to the edge array.

According to another embodiment, a computer-implemented method can comprise employing, by a system comprising a processor, a first application programming interface of a first application to access first information from the first application on a first server in a first security zone, and processing, by the system, the first information, resulting in second information. The method can further comprise communicating, by the system, the second information to a remote service on a second server in a second security zone.

According to another embodiment, a computer program product is provided. The computer program product can comprise machine-readable storage medium comprising executable instructions that, when executed by a processor, facilitate performance of operations comprising accessing first information from a first application on a first server in a first security zone, wherein the accessing employs a first application programming interface of a first application to access first information from the first application on a first server in the first security zone, and processing, by the system, the first information, resulting in second information. The instructions can further comprise communicating, by the system, the second information to a remote service on a second server in a second security zone.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards facilitating the employment of edge arrays for unified analytics and troubleshooting of enterprise applications. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
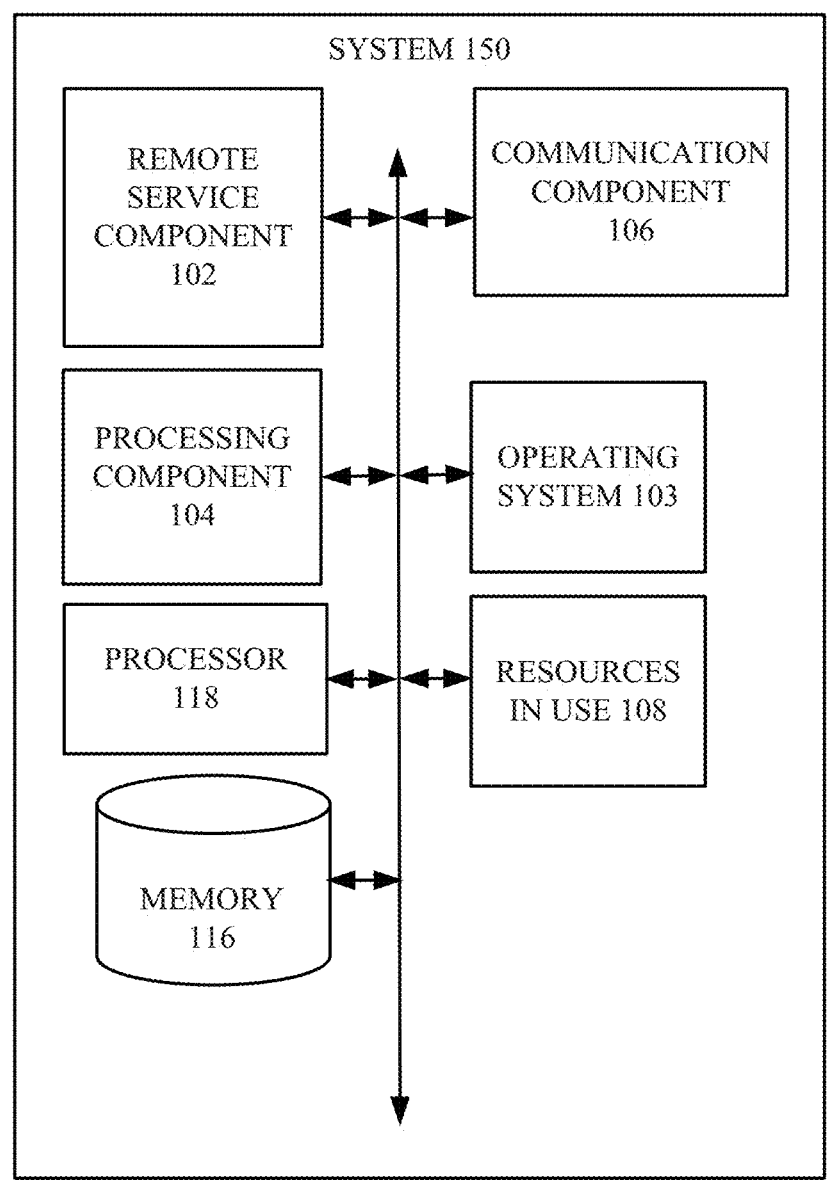
FIG. 1 illustrates a block diagram of an example, non-limiting system that can facilitate employing edge arrays for unified analytics and troubleshooting of enterprise applications, in accordance with various aspects and implementations of the subject disclosure.

FIG. 1 illustrates a block diagram 100 of an example, non-limiting system 150 that can facilitate employing edge arrays for unified analytics and troubleshooting of enterprise applications, in accordance with various aspects and implementations of the subject disclosure.

System 150 as depicted can include operating system 103, such as a Linux®-based operating system, which can manage the resources in use 108. Note that resources in use 108 can in include resources in use for execution by processor 118. In one or more embodiments, system 150 can include remote service component 102, processing component 104, and communication component 106. As discussed further below, system 150 can operate in a first security zone and receive data from an edge array in a second security zone.

For example, remote service component 102 can receive first information from an edge array installed in the second security zone. As discussed further with FIG. 3 below, the edge array can employ an application programming interface (API) of an application to generate the first information from the application on a server in the second security zone. Processing component 104 can process the first information to generate second information. Communication component 106 can communicate the second information to the edge array in the second security zone.

As discussed further below with FIG. 8, in some embodiments, memory 116 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 116 are described below with reference to system memory 816 and FIG. 8. Such examples of memory 116 can be employed to implement any embodiments of the subject disclosure.

According to multiple embodiments, processor 118 can comprise one or more types of processors and/or electronic circuitry that can implement one or more computer and/or machine readable, writable, and/or executable components and/or instructions that can be stored on memory 116. For example, processor 118 can perform various operations that can be specified by such computer and/or machine readable, writable, and/or executable components and/or instructions including, but not limited to, logic, control, input/output (I/O), arithmetic, and/or the like. In some embodiments, processor 118 can comprise one or more central processing unit, multi-core processor, microprocessor, dual microprocessors, microcontroller, System on a Chip (SOC), array processor, vector processor, and/or another type of processor. Further examples of processor 118 are described below with reference to processing unit 814 and FIG. 8. Such examples of processor 118 can be employed to implement any embodiments of the subject disclosure.

Figure 2:
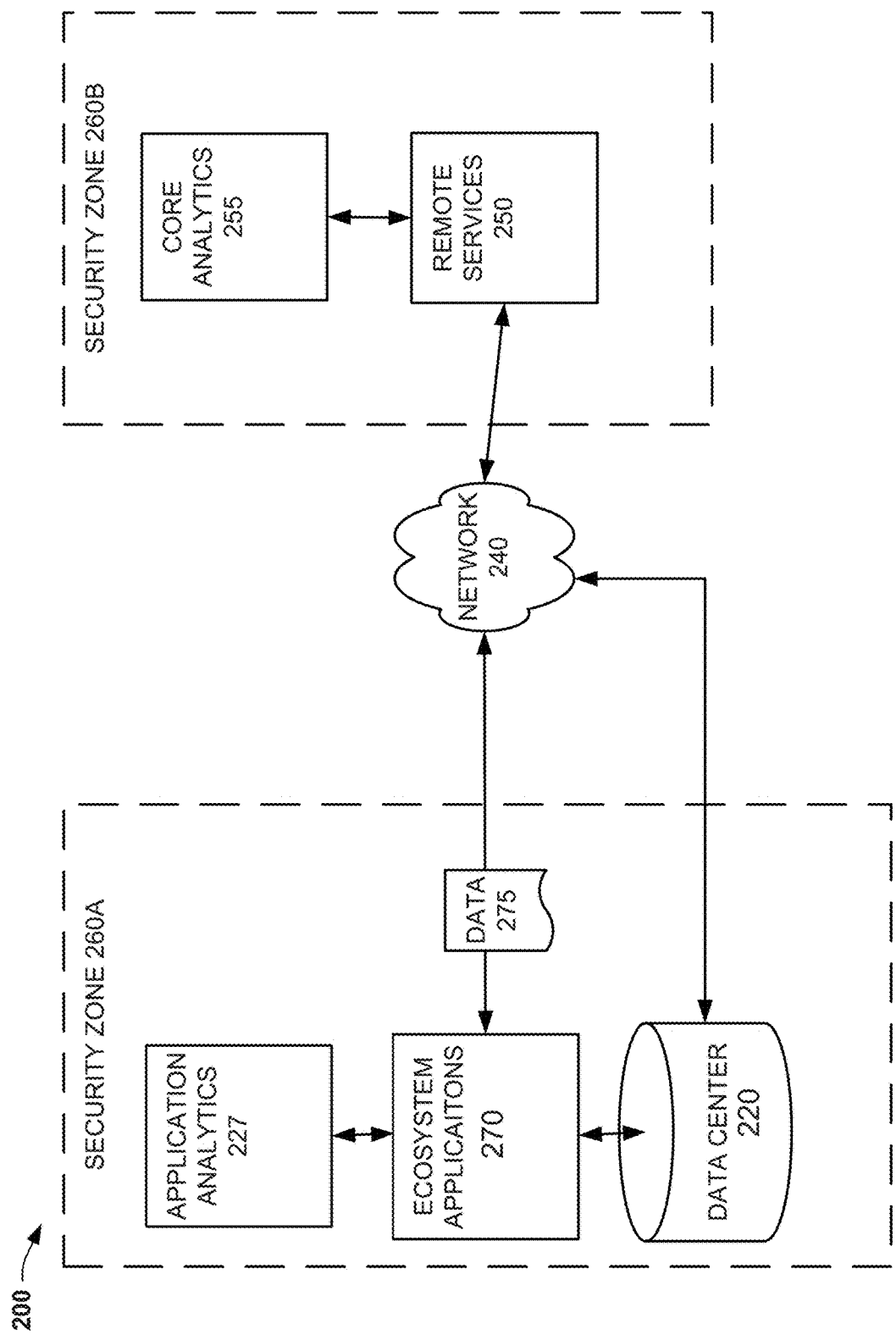
FIG. 2 illustrates an example environment for a system that can provide remote services for enterprise applications, in accordance with various aspects and implementations of the subject disclosure.

FIG. 2 illustrates an example environment for a system 200 that can provide remote services 250 for enterprise applications (e.g., data center 220), in accordance with various aspects and implementations of the subject disclosure. For purposes of brevity, description of like elements and/or processes employed in other embodiments is omitted.

In one or more embodiments, data center 220 can operate in security zone 260A, with the data center receiving and providing data by employing network 240. As used when describing some embodiments herein, a security zone generally corresponds to a zone of protection for information by an organization. In this example, security zones 260A-B can be different organizations, e.g., data center 220 can be operated in security zone 260A by a business enterprise that offers data storage services, and remote services 250 can be operated in security zone 260B by an organization that designs and implements storage arrays for organizations.

In one or more embodiments, data center 220 can operate based on data storage arrays comprising combinations of hardware and software, e.g., storage arrays provided by DELL EMC, including PowerMAX®, XtremIO®, Unity®, and VNX®. In one or more embodiments, ecosystem applications 270 can provide different services to data center 220. Different ecosystem applications are discussed with FIG. 4 below, and can provide services that include, but are not limited to, backup, replication, recovery, and virtualization services. One having skill in the relevant arts, given the description herein, would appreciate that ecosystem applications 270 can provide additional services, and other types of enterprise software different from data center 220 can also be supported by one or more embodiments.

In one or more embodiments, data center 220 in security zone 260A can be connected via network 240 to remote services 250 operating in security zone 260B. In different implementations, remote services 250 can provide external services to one or more data storage arrays of data center 220. For example, in one or more embodiments, remote services 250 can include the generation of storage analytics based on the operation of data center 220, e.g., generated by core analytics 255, such as DELL EMC Enterprise Storage Analytics®. In another example, performance monitoring and issue prevention services for data center 220 can be provided by remote services 250, e.g., provided by DELL EMC, Secure Remote Services® and CloudIQ®. It should also be appreciated that, in one or more embodiments, the operation of ecosystem applications 270 can be analyzed by application analytics 227, this component being, in some circumstances, a part of ecosystem applications 270 and customized to the operation of ecosystem applications 270. In an example, VMWare® data center virtualization provided by VMWARE, Inc., can be an ecosystem application 270, and the VMWare Capacity Analytics Engine® is an example of application analytics 227, e.g., analytics that is a part of ecosystem applications 270 and is specific to the ecosystem application 270.

As described with FIG. 3 below, in one or more embodiments, portions of application analytics 227 data can be combined with other analytics by an edge array, and these aggregated analytics can be provided to remote services 250 for further analysis by core analytics 255. For example, as depicted in FIG. 2, in some circumstances, remote services 250 can receive an instance of data 275 (e.g., data to be analyzed by core analytics 255), and in other circumstances, ecosystem applications 270 can receive an instance of data 275 (e.g., troubleshooting instructions and setting changes to enhance performance).

Figure 3:
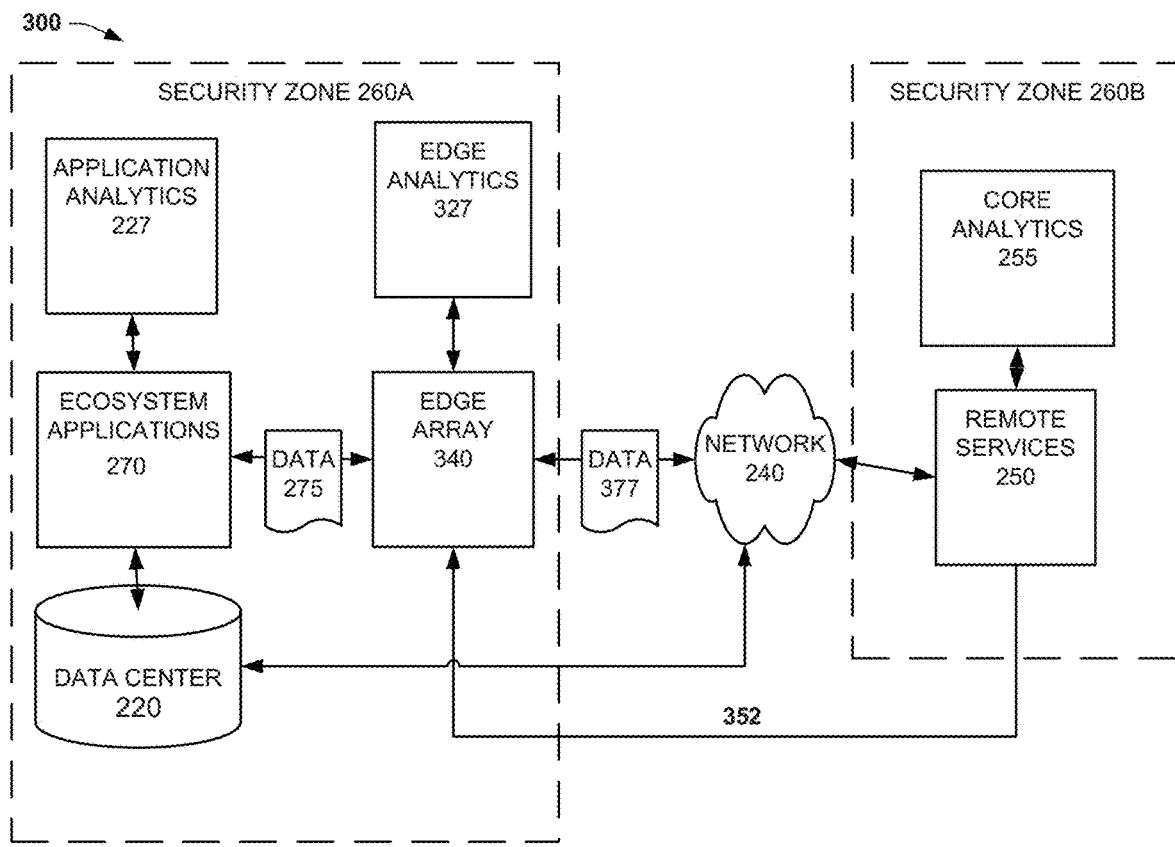
FIG. 3 illustrates another example environment for a system that can facilitate employing edge arrays for unified analytics and troubleshooting, in accordance with various aspects and implementations of the subject disclosure.

FIG. 3 illustrates another example environment for a system 300 that can facilitate employing edge arrays 340 for unified analytics and troubleshooting, in accordance with various aspects and implementations of the subject disclosure. For purposes of brevity, description of like elements and/or processes employed in other embodiments is omitted.

Generally speaking, one or more embodiments use can use an edge architecture and ecosystem-aware edge array 340. Because of this awareness of different aspects of ecosystem applications 270, and in comparison to conventional approaches, edge array 340 can also be termed a smart array. It should be noted that, as used to described one or more embodiments herein, an edge system (e.g., edge array 340) can be an independent system that positioned on the outside periphery or edge of the network architecture. In some examples of edge systems, these systems are not installed on the physical boxes of the core business systems, e.g., data center 220 servers, and ecosystem application 270 servers. Typically, edge systems can be used to increase security associated with preventing data from being improperly transferred out of core business systems, as well as preventing threats from having access to the systems.

In one or more embodiments, edge array 340 can be used to collect data 275 and perform some of the processing and analytics described above with respect to remote services 250, with differences that can be beneficial in some circumstances, e.g., edge array 340 can perform some processing of ecosystem applications 270 inside security zone 260A. For example, in some circumstances, edge array 340 can improve the security of data center 220 by only sending required information to remote services 250. Similarly, by receiving change instructions from remote services 250, in one or more embodiments, edge array 340 analyze, verify, modify if needed, and securely communicate instructions to data center 220 for implementation.

In one or more embodiments, by employing edge arrays 340, some analytical and processing capabilities can be advantageously moved from remote services 250 in security zone 260B to the edge array 340 in security zone 260A. In one or more embodiments, edge array 340 can determine what data should be sent to remote services 250 for analysis. By sending only required data and avoiding data dumps sent to remote service 250, this approach can reduce the amount of information communicated to remote services 250 and thus reduce network bandwidth usage. Additional advantages can be achieved because reducing the sending of some types of data outside of the data center 220 security zone 260A can decrease security risks.

In an example approach used by one or more embodiments, edge array 340 can collect data 275 from ecosystem applications 270, and execute initial analytics on the data. If additional processing is required, edge array 340 can request additional analysis by application analytics 227 or communicate data 377 to remote services 250.

Figure 4:
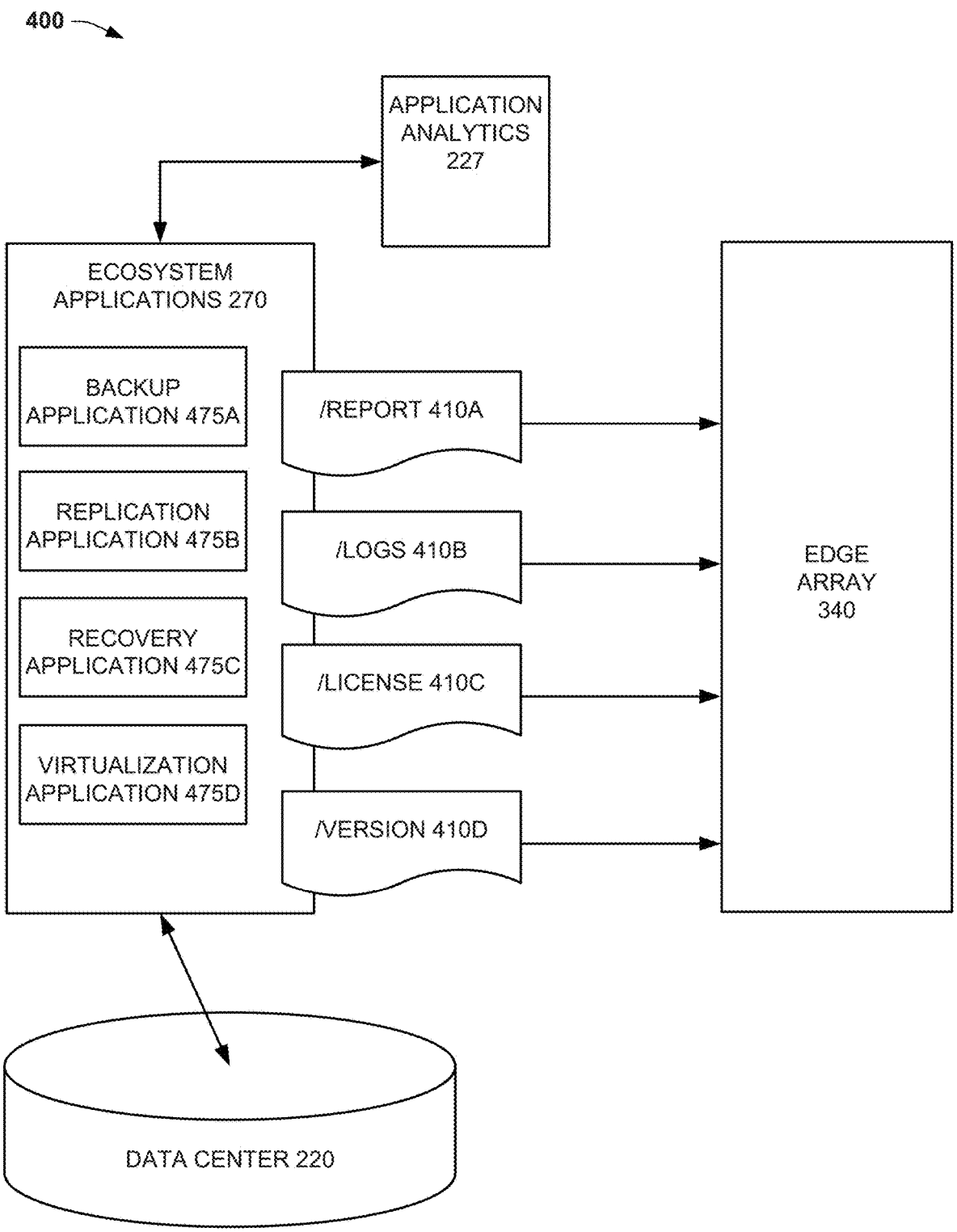
FIG. 4 illustrates a more detailed view of an example data center with ecosystem applications and an edge array, in accordance with various aspects and implementations of the subject disclosure.

FIG. 4 illustrates a more detailed view 400 of an example data center 220 with ecosystem applications 270 and edge array 340, in accordance with various aspects and implementations of the subject disclosure. For purposes of brevity, description of like elements and/or processes employed in other embodiments is omitted.

As noted above, ecosystem applications 270 can include, but are not limited to, backup application 475A (e.g., ProtectPoint® provided by DELL EMC), replication application 475B (e.g., AppSync® provided by DELL EMC, and RecoverPoint® provided by DELL EMC), recovery application 475C (e.g., Site Recovery Manager® provided by VMWare), and virtualization application 475D (e.g., VPLEX provided by DELL EMC).

With respect to edge array 340, different features included in one or more embodiments are described below. In one or more embodiments, new users can access edge array 340 without any functional use case enabled, and potentially only for certain functions, e.g., accessing storage analytics.

In one or more embodiments, in contrast to the description of FIG. 2 above, remote service 250 can be enabled to receive data from edge array 340, and be prevented from processing data from one or more ecosystem applications 270, e.g., for troubleshooting, debugging, and analytics. In some circumstances, this can improve the operation of edge array 340, e.g., by consistently having certain service requests handled by edge array 340. In some examples, once edge array 340 has processed data 275 (e.g., system data for the generation of analytics), some of the results can be communicated as data 377 to remote services 250 for other services, e.g., integration with different data sources and additional generation of analytics.

In one or more embodiments, edge array can be granted a limited analytics access to data stored in data center 220. Additionally, for use with role-based access control approaches, an array role can be implemented. FIG. 4 depicts different types of data that, with appropriate permissions, can be used by edge array 340 to generate analytics, e.g., report 410A and logs 410B can be analyzed by one or more embodiments of edge array 340.

Additionally, edge array 340 can manage application activities that include, but are not limited to, application compatibility, validation, upgrade, and service. To enable these services, in one or more embodiments, ecosystem application 270 can receive application information including, license 410C and version 410D. Based at least on this application information, in one or more embodiments, edge array 340 can provide troubleshooting and issue identification services, e.g., based on data 275 collected. In one or more embodiments, edge array 340 can use this application information to validate license information of ecosystem applications, generate notifications associated with the license, and perform initial analytics on application data. Additionally, one or more embodiments can provide unified notifications from two or more of ecosystem applications 270.

Figure 5:
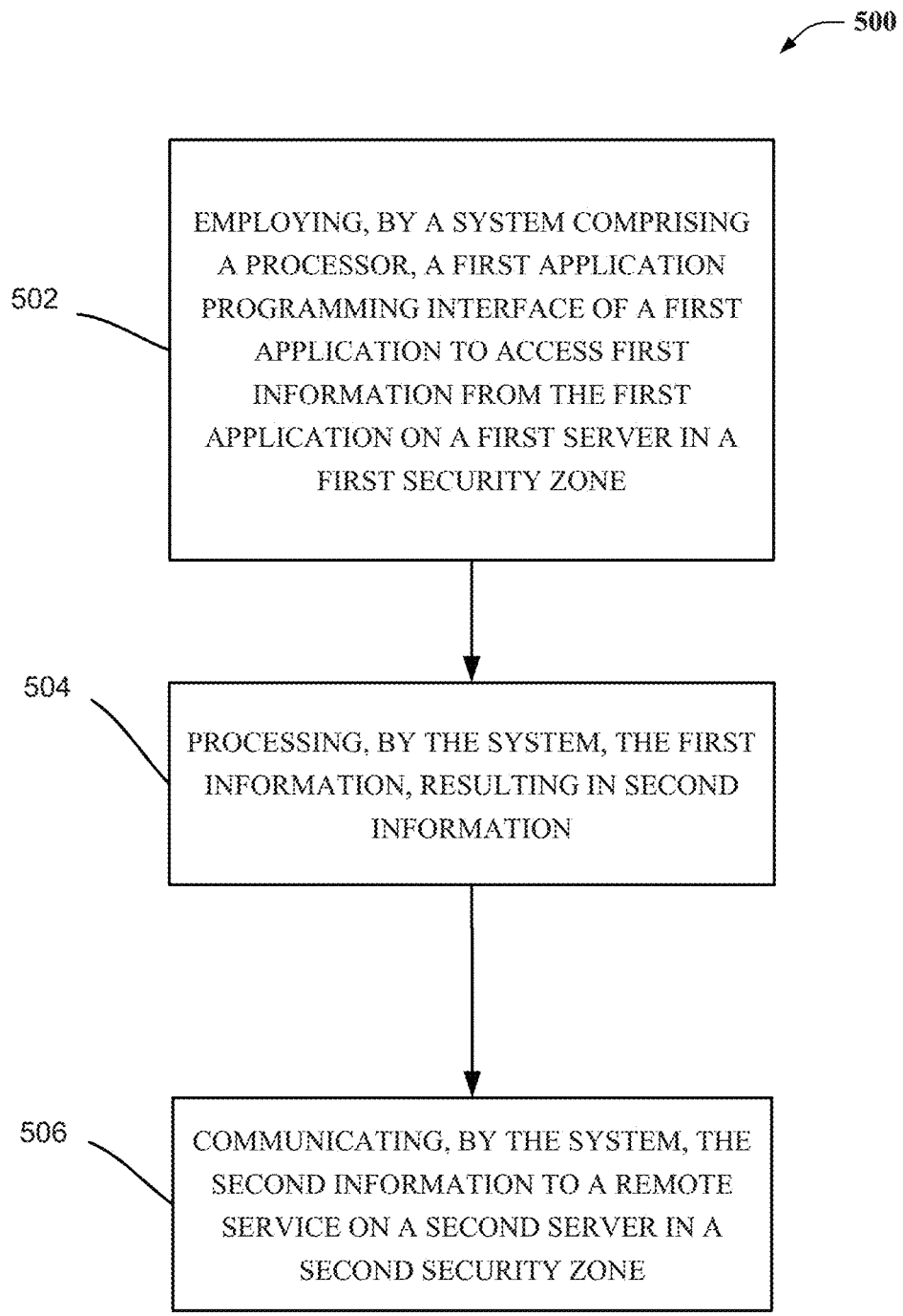
FIG. 5 illustrates an example flow diagram for a method that can facilitate employing edge arrays for unified analytics and troubleshooting of enterprise applications, in accordance with one or more embodiments.

FIG. 5 illustrates an example flow diagram for a method 500 that can facilitate employing edge arrays for unified analytics and troubleshooting of enterprise applications, in accordance with one or more embodiments. For purposes of brevity, description of like elements and/or processes employed in other embodiments is omitted.

At element 502, method 500 can comprise employing, by system 150 comprising a processor 118, a first application programming interface of a first application (e.g., backup application 475A) to access first information (e.g., data 275 including version information or data to be analyzed) from the first application on a first server in a first security zone 260A.

At element 504, method 500 can comprise processing, by the system 150, the first information, resulting in second information. For example, processing, by the system, the first information, resulting in second information. At element 506, method 500 can comprise communicating, by the system, the second information (e.g., data 377) to a remote service 250 on a second server in a second security zone 260B.

Figure 6:
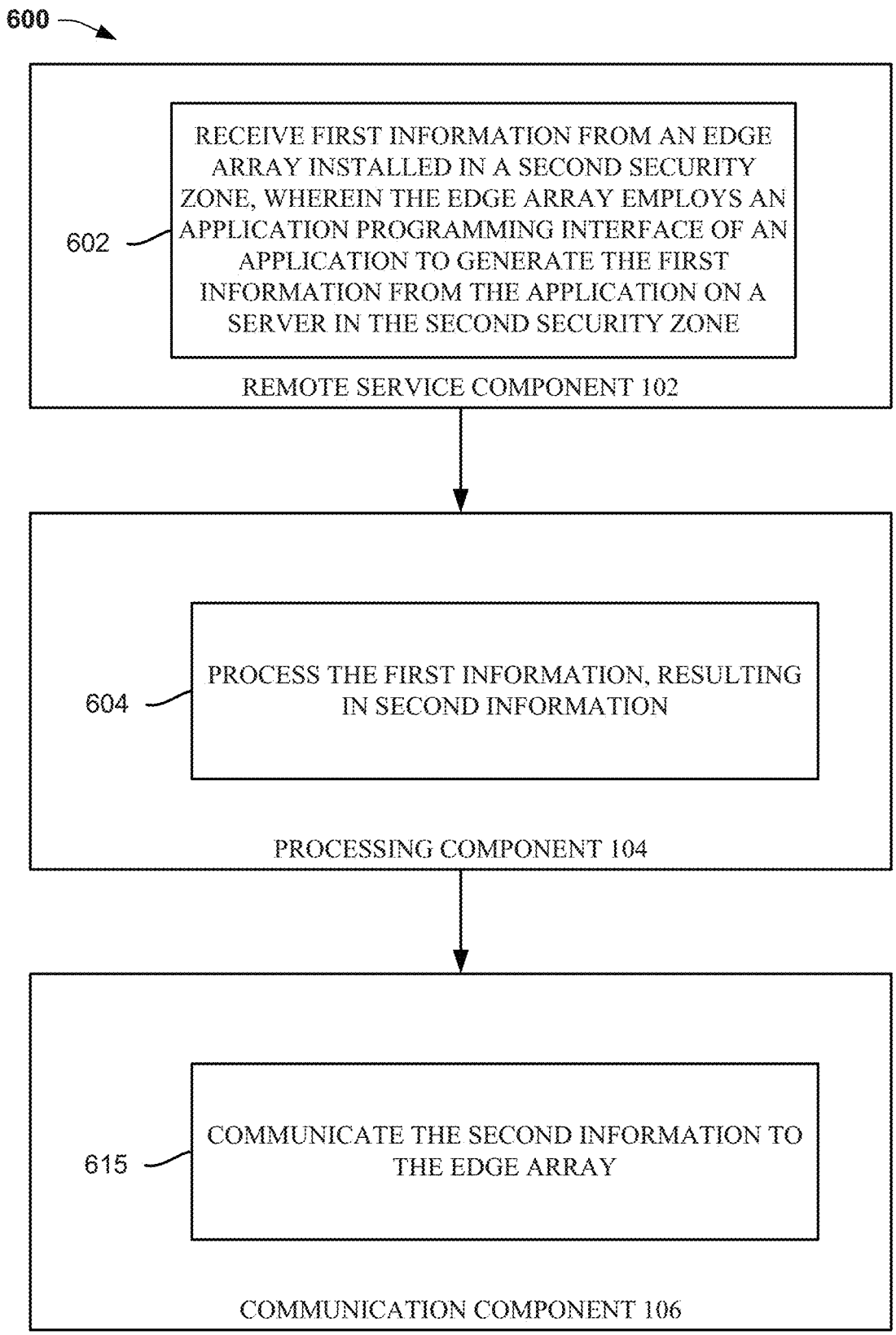
FIG. 6 illustrates an example flow diagram representing example operations of remote service component, processing component, and communication component that can facilitate the employment of edge arrays for unified analytics and troubleshooting of enterprise applications, in accordance with one or more embodiments

FIG. 6 is a flow diagram 600 representing example operations of a system in a first security zone 260B comprising a remote service component 102, processing component 104, and communication component 107 that can facilitate the employment of edge arrays 340 for unified analytics and troubleshooting of enterprise applications (e.g., ecosystem applications 270), in accordance with one or more embodiments. For purposes of brevity, description of like elements and/or processes employed in other embodiments is omitted.

Remote service component 102 can be configured 602 to receive first information (e.g., data 377) from an edge array 340 installed in a second security zone 260A, wherein the edge array employs an application programming interface of an application to generate the first information from the application on a server in the second security zone.

Processing component 104 can be configured 604 to process the first information (e.g., data 377), resulting in second information. Communication component 106 can be configured 606 to communicate 352 the second information to the edge array 340.

Figure 7:
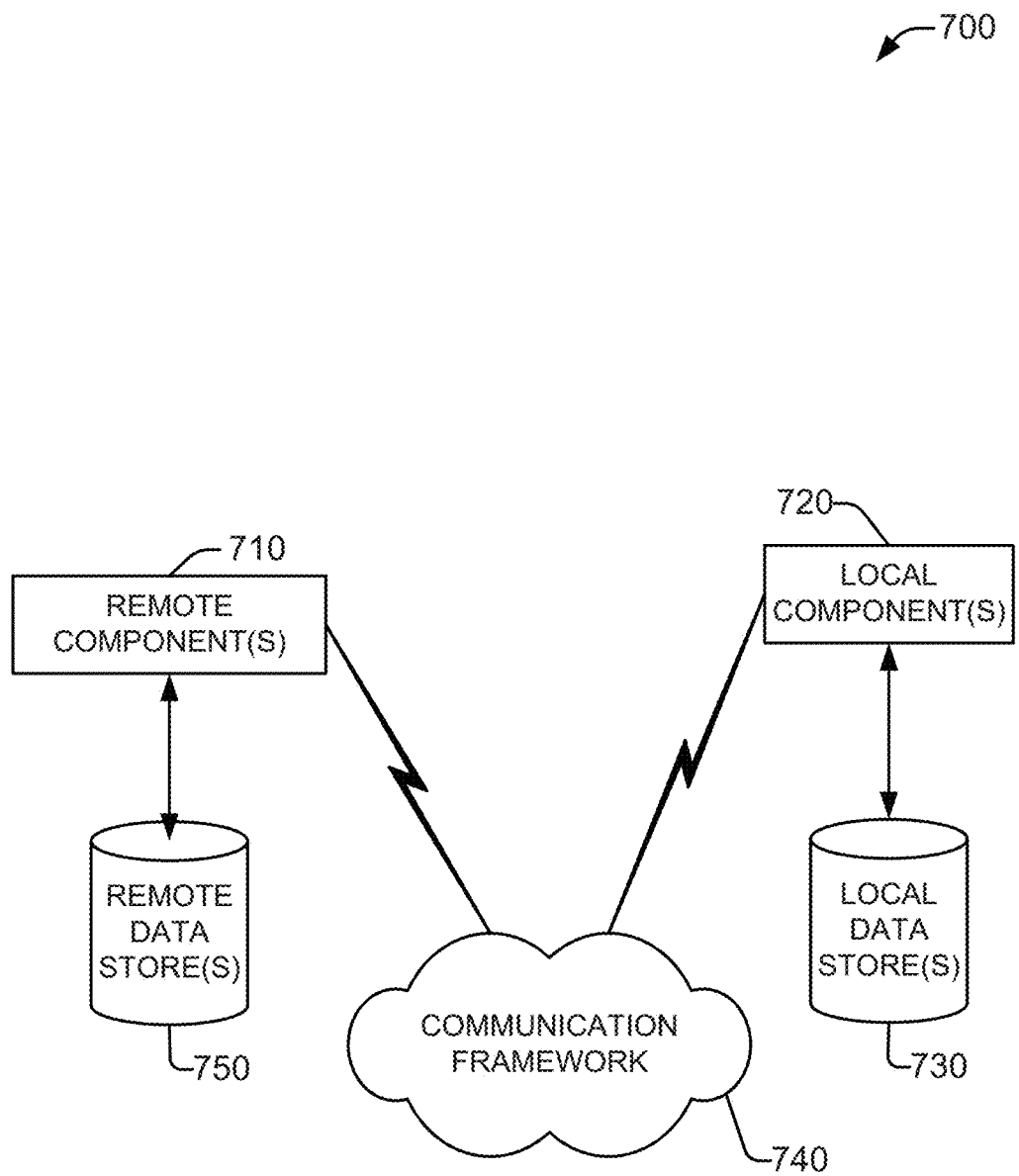
FIG. 7 depicts an example schematic block diagram of a computing environment with which the disclosed subject matter can interact.

FIG. 7 is a schematic block diagram of a computing environment 700 with which the disclosed subject matter can interact. The system 700 comprises one or more remote component(s) 710. The remote component(s) 710 can be hardware and/or software (e.g., threads, processes, computing devices). In some embodiments, remote component(s) 710 can be a distributed computer system, connected to a local automatic scaling component and/or programs that use the resources of a distributed computer system, via communication framework 740. Communication framework 740 can comprise wired network devices, wireless network devices, mobile devices, wearable devices, radio access network devices, gateway devices, femtocell devices, servers, etc.

The system 700 also comprises one or more local component(s) 720. The local component(s) 720 can be hardware and/or software (e.g., threads, processes, computing devices). In some embodiments, local component(s) 720 can comprise remote service component 102, processing component 104, and communication component 106.

One possible communication between a remote component(s) 710 and a local component(s) 720 can be in the form of a data packet adapted to be transmitted between two or more computer processes. Another possible communication between a remote component(s) 710 and a local component(s) 720 can be in the form of circuit-switched data adapted to be transmitted between two or more computer processes in radio time slots. The system 700 comprises a communication framework 740 that can be employed to facilitate communications between the remote component(s) 710 and the local component(s) 720, and can comprise an air interface, e.g., Uu interface of a UMTS network, via a long-term evolution (LTE) network, etc. Remote component(s) 710 can be operably connected to one or more remote data store(s) 750, such as a hard drive, solid state drive, SIM card, device memory, etc., that can be employed to store information on the remote component(s) 710 side of communication framework 740. Similarly, local component(s) 720 can be operably connected to one or more local data store(s) 730, that can be employed to store information on the local component(s) 720 side of communication framework 740.

Figure 8:
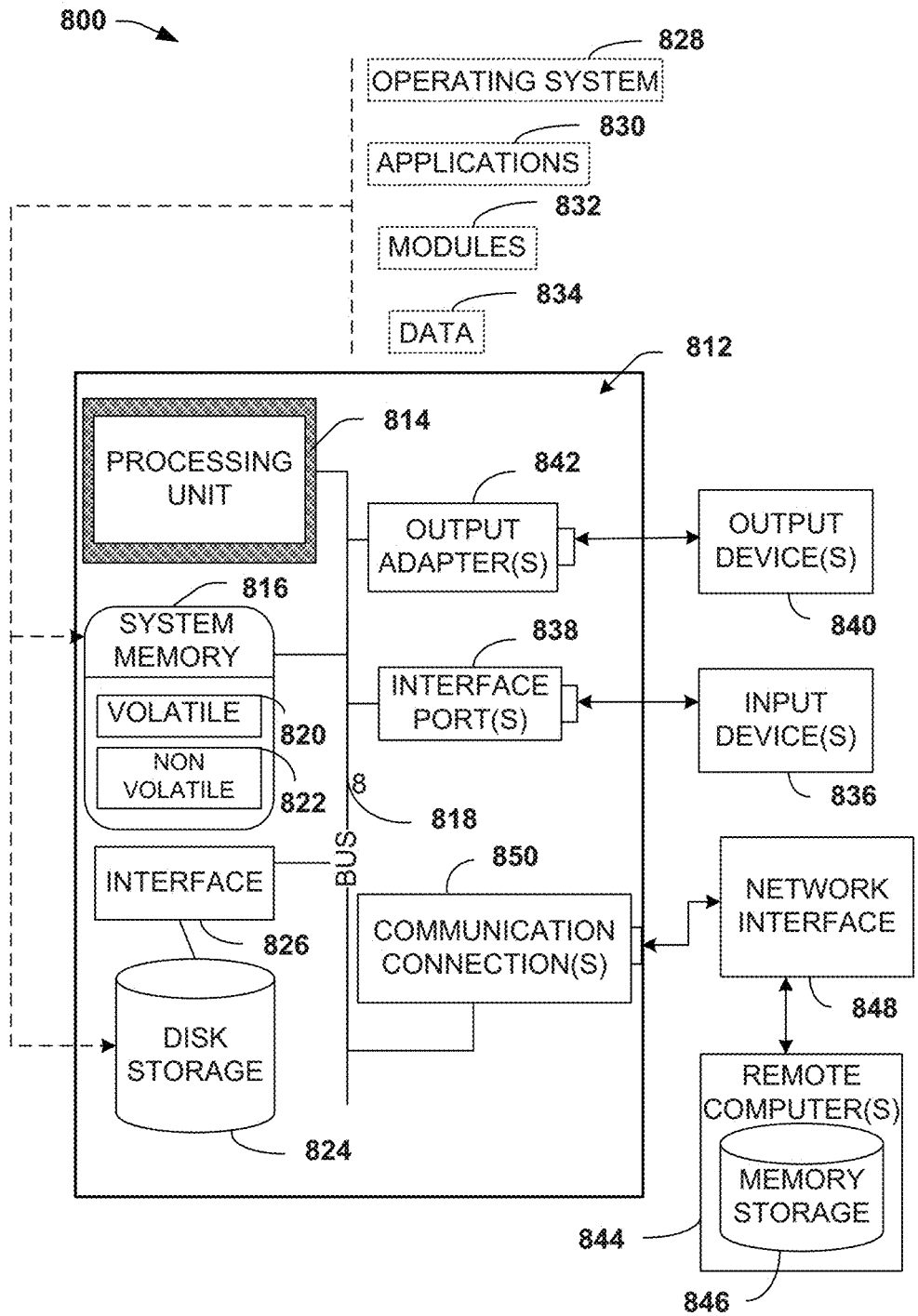
FIG. 8 illustrates an example block diagram of a computing system operable to execute the disclosed systems and methods in accordance with various aspects and implementations of the subject disclosure.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 722 (see below), disk storage 724 (see below), and memory storage 946 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 8 illustrates a block diagram of a computing system 800 operable to execute the disclosed systems and methods in accordance with one or more embodiments/implementations described herein. Computer 812 can comprise a processing unit 814, a system memory 816, and a system bus 818. System bus 818 couples system components comprising, but not limited to, system memory 816 to processing unit 814. Processing unit 814 can be any of various available processors. Dual microprocessors and other multiprocessor architectures also can be employed as processing unit 814.

System bus 818 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 816 can comprise volatile memory 820 and nonvolatile memory 822. A basic input/output system, containing routines to transfer information between elements within computer 812, such as during start-up, can be stored in nonvolatile memory 822. By way of illustration, and not limitation, nonvolatile memory 822 can comprise read only memory, programmable read only memory, electrically programmable read only memory, electrically erasable read only memory, or flash memory. Volatile memory 820 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 812 can also comprise removable/non-removable, volatile/non-volatile computer storage media. FIG. 8 illustrates, for example, disk storage 824. Disk storage 824 comprises, but is not limited to, devices like a magnetic disk drive, floppy disk drive, tape drive, flash memory card, or memory stick. In addition, disk storage 824 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 824 to system bus 818, a removable or non-removable interface is typically used, such as interface 826.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 8 describes software that acts as an intermediary between users and computer resources described in suitable operating environment 800. Such software comprises an operating system 828. Operating system 828, which can be stored on disk storage 824, acts to control and allocate resources of computer system 812. System applications 830 take advantage of the management of resources by operating system 828 through program modules 832 and program data 834 stored either in system memory 816 or on disk storage 824. It is to be noted that the disclosed subject matter can be implemented with various operating systems or combinations of operating systems.

A user can enter commands or information into computer 812 through input device(s) 836. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 812. Input devices 836 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 814 through system bus 818 by way of interface port(s) 838. Interface port(s) 838 comprise, for example, a serial port, a parallel port, a game port, a universal serial bus, an infrared port, a Bluetooth port, an IP port, or a logical port associated with a wireless service, etc. Output device(s) 840 use some of the same type of ports as input device(s) 836.

Thus, for example, a universal serial busport can be used to provide input to computer 812 and to output information from computer 812 to an output device 840. Output adapter 842 is provided to illustrate that there are some output devices 840 like monitors, speakers, and printers, among other output devices 840, which use special adapters. Output adapters 842 comprise, by way of illustration and not limitation, video and sound cards that provide means of connection between output device 840 and system bus 818. It should be noted that other devices and/or systems of devices provide both input and output capabilities such as remote computer(s) 844.

Computer 812 can operate in a networked environment using logical connections to one or more remote computers, such as remote computer(s) 844. Remote computer(s) 844 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 812. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 846 is illustrated with remote computer(s) 844. Remote computer(s) 844 is logically connected to computer 812 through a network interface 848 and then physically connected by way of communication connection 850. Network interface 848 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 850 refer(s) to hardware/software employed to connect network interface 848 to bus 818. While communication connection 850 is shown for illustrative clarity inside computer 812, it can also be external to computer 812. The hardware/software for connection to network interface 848 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system in a first security zone, comprising:
   a memory that stores computer executable components; and
   a processor that executes the computer executable components stored in the memory, wherein the computer executable components comprise:
      a remote service component that receives first information from an edge array installed in a second security zone, wherein the edge array employs an application programming interface of an application to generate the first information from the application on a server in the second security zone, wherein the first information was selected by the edge array to reduce network bandwidth usage for processing by the remote service component, and wherein the first information comprises data to be analyzed;
      a processing component that processes the first information, resulting in second information; and
      a communication component that communicates the second information to the edge array.

2. The system of claim 1, wherein the first information further comprises notice that the edge array validated a product license of the application.

3. The system of claim 1, wherein the first information further comprises notice of a compatibility of a version of the application with another application operating in the second security zone.

4. The system of claim 1, wherein the first information further comprises analytics based on application data of the application.

5. The system of claim 1, wherein the application comprises a data protection application supporting a storage array in a data center.

6. The system of claim 1, wherein the first information further comprises aggregated analytics based on application data of the application and another application operating in the second security zone.

7. The system of claim 1, wherein the application is one of a group of data protection applications that support a storage array operating in the second security zone, and the first information further comprises characteristics of ones of the group of data protection applications stored at the edge array.

8. The system of claim 7, wherein the first information further comprises a notice of an event associated with the application.

9. A method, comprising:
   based on a request from a remote service on a second server in a second security zone, identifying, by a system comprising a processor, first information from a first application on a first server in a first security zone, wherein the request was generated by the remote service to reduce network bandwidth usage for processing the first information, and wherein the first information comprises data to be analyzed;
   employing, by the system, a first application programming interface of the first application to the first information;
   processing, by the system, the first information, resulting in second information; and
   communicating, by the system, the second information to the remote service on the second server.

10. The method of claim 9, wherein the first information further comprises a product license of the first application, the processing the first information comprises validating the product license, and the second information comprises a notification of the validating.

11. The method of claim 9, wherein the first information further comprises a version of the first application and the processing the first information comprises determining a compatibility of the version with another application, and the second information comprises a notification of the compatibility.

12. The method of claim 9, wherein the first information further comprises application data of the first application, the processing the first information comprises generating first analytics based on the application data, and the second information comprises the first analytics.

13. The method of claim 12, further comprising:
   employing, by the system, a second application programming interface of a second application to access third information from the second application on the first server in the first security zone;
   processing, by the system, the third information, resulting in second analytics regarding the operation of the second application; and
   aggregating, by the system, the first and second analytics to generate aggregated analytics, wherein the second information comprises the aggregated analytics.

14. The method of claim 9, wherein the first application is a data protection application that supports a storage array operating in the first security zone.

15. The method of claim 14, wherein the first application comprises part of a plurality of data protection applications that support the storage array, and wherein the method further comprises accessing and storing, by the system, characteristics of ones of the plurality of data protection applications.

16. The method of claim 9, wherein the first information further comprises a description of an event associated with the first application, the processing the first information comprises analyzing the description, and the second information comprises a notification of the event.

17. A non-transitory machine-readable medium comprising executable instructions that, when executed by a processor, facilitate performance of operations, the operations comprising:
based on a request from a remote service on a second server in a second security zone, identifying first information from a first application on a first server in a first security zone, wherein the request was generated by the remote service to reduce network bandwidth usage for processing the first information, and wherein the first information comprises data to be analyzed;
accessing the first information, wherein the accessing employs a first application programming interface of the first application to access the first information;
processing, by the system, the first information, resulting in second information; and
communicating, by the system, the second information to the remote service on the second server.

18. The non-transitory machine-readable medium of claim 17, wherein the operations further comprise:
employing a second application programming interface of a second application to access third information from the second application on the first server in the first security zone;
processing the third information, resulting in second analytics regarding the operation of the second application; and
aggregating the first and second analytics to generate aggregated analytics, wherein the second information comprises the aggregated analytics.

19. The non-transitory machine-readable medium of claim 17, wherein the first application comprises a data protection application that supports a storage array operating in the first security zone.

20. The non-transitory machine-readable medium of claim 19, wherein the first application comprises part of a plurality of data protection applications that support the storage array, and wherein the method further comprises accessing and storing characteristics of ones of the plurality of data protection applications.

* * * * *